No. 634,118. Patented Oct. 3, 1899.
W. MAYES.
DANGER SIGNAL SYSTEM.
(Application filed Sept. 6, 1898.)
(No Model.) 6 Sheets—Sheet 2.
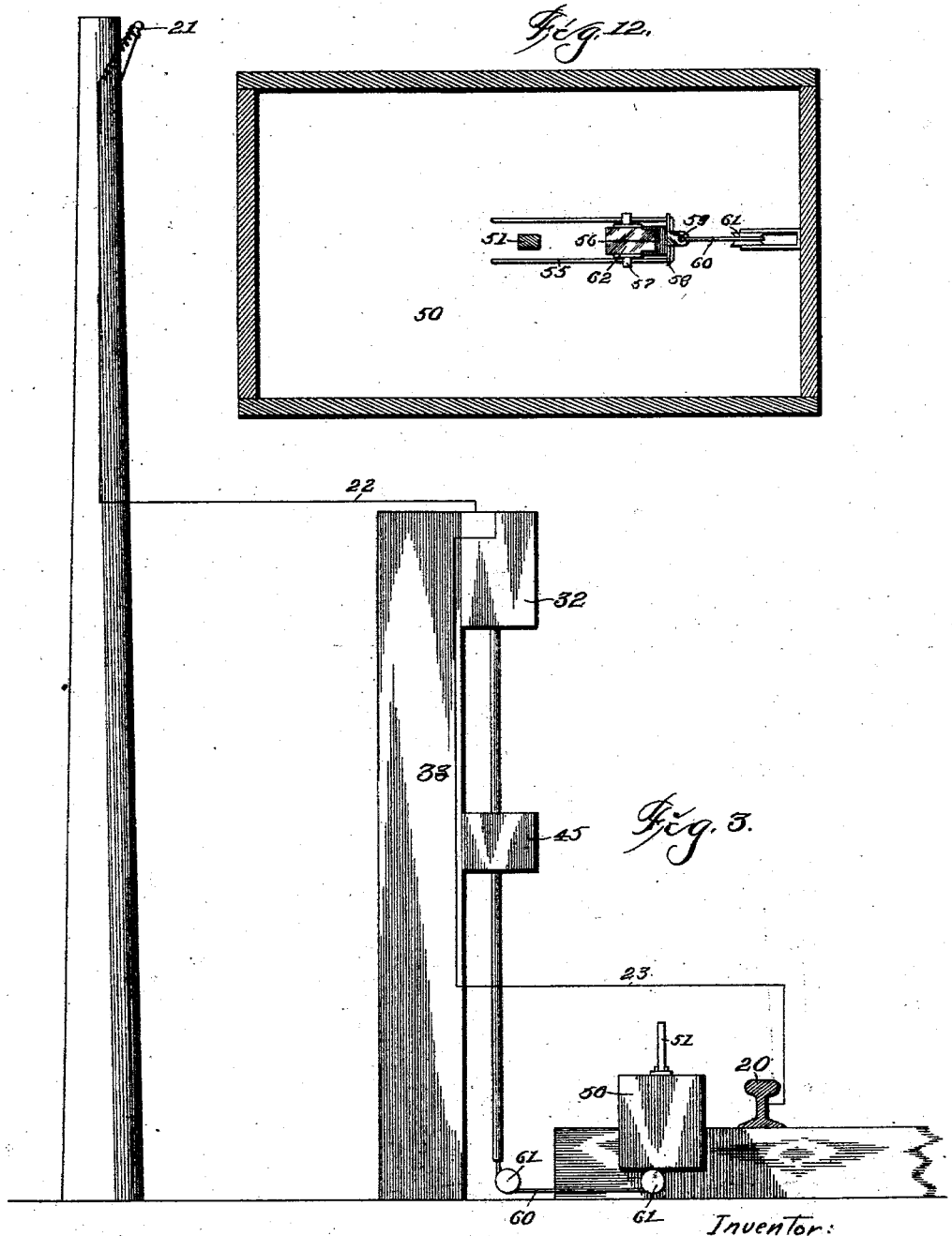

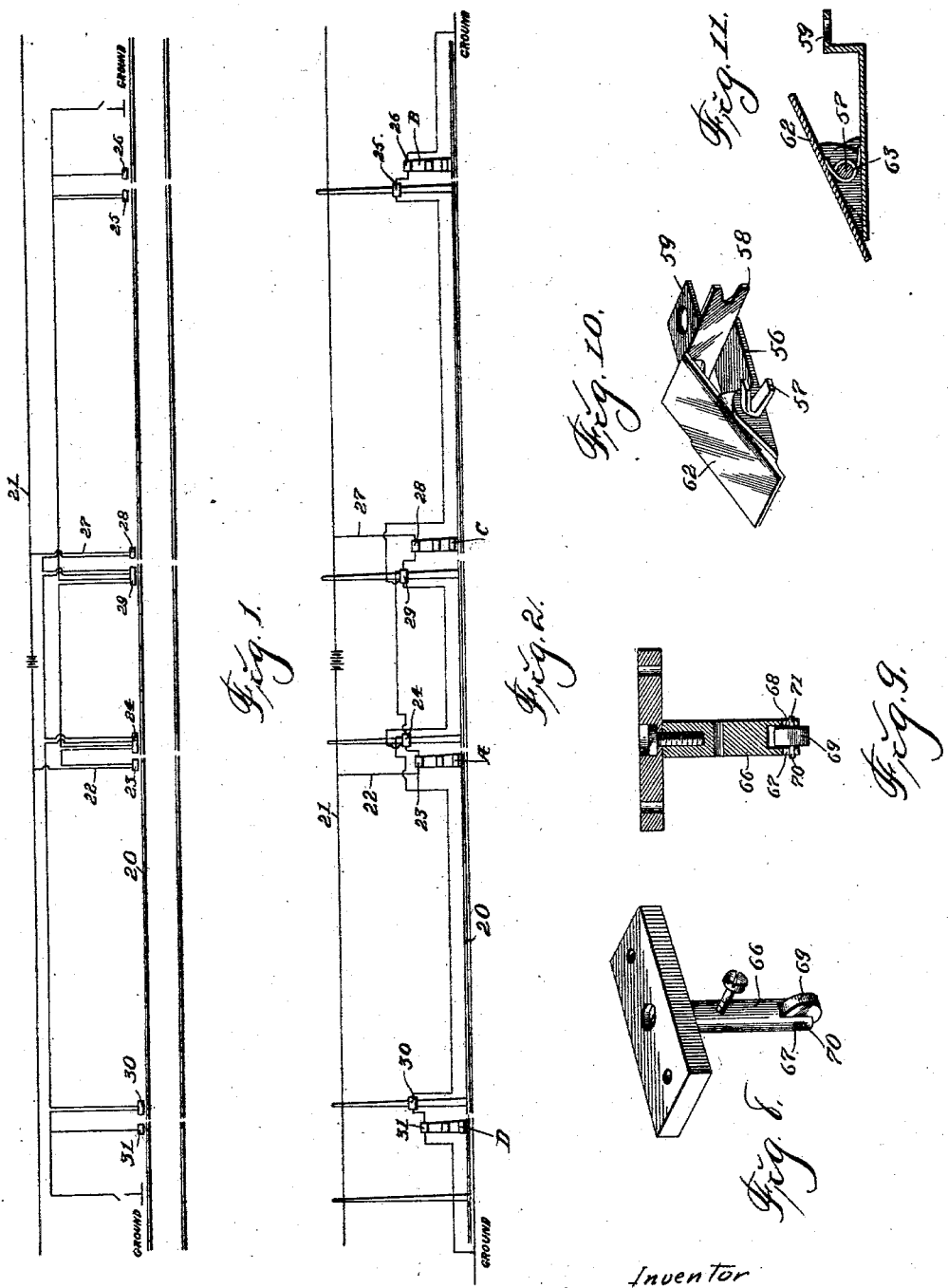

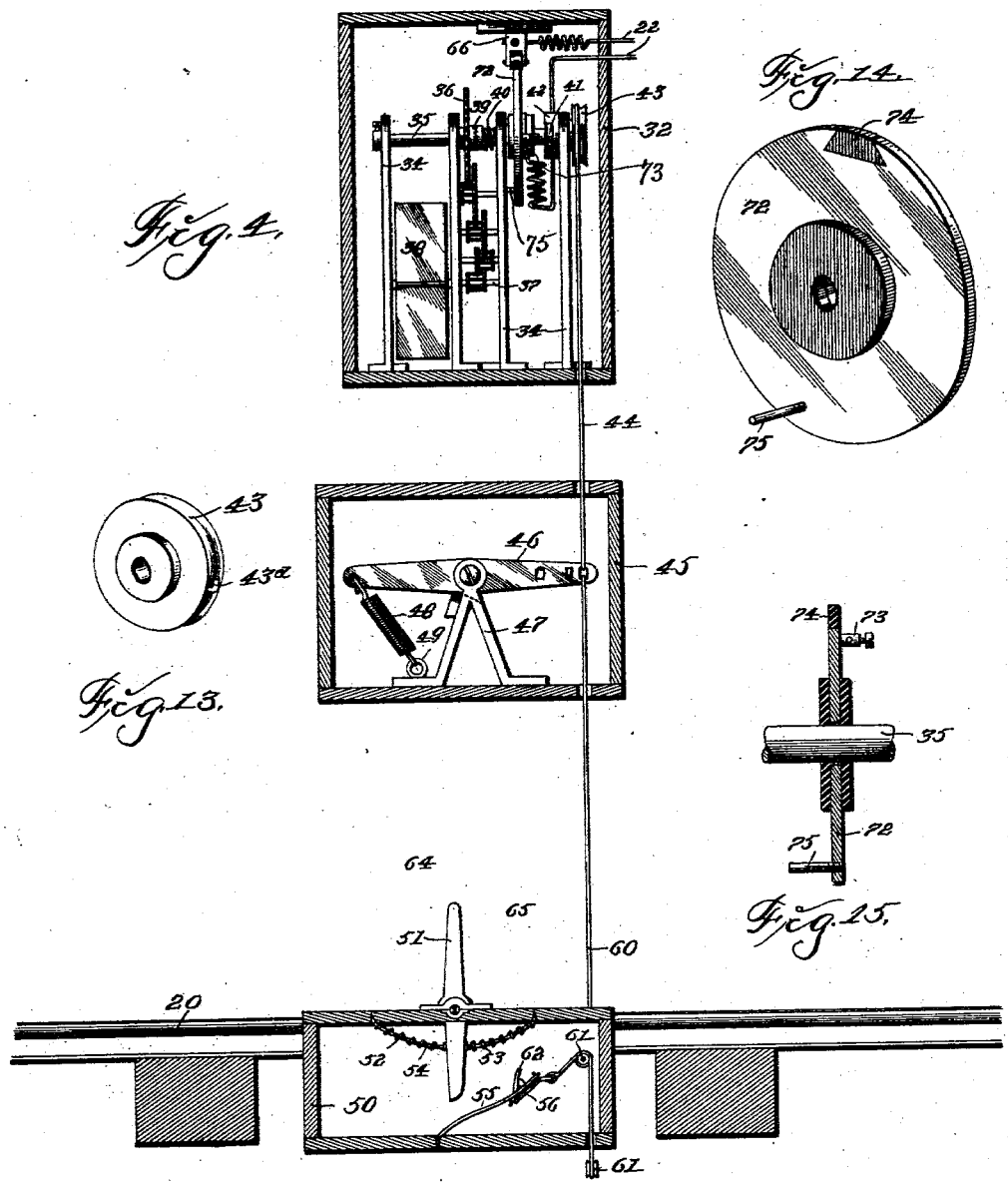

No. 634,118. Patented Oct. 3, 1899.
W. MAYES.
DANGER SIGNAL SYSTEM.
(Application filed Sept. 6, 1898.)
(No Model.) 6 Sheets—Sheet 4.
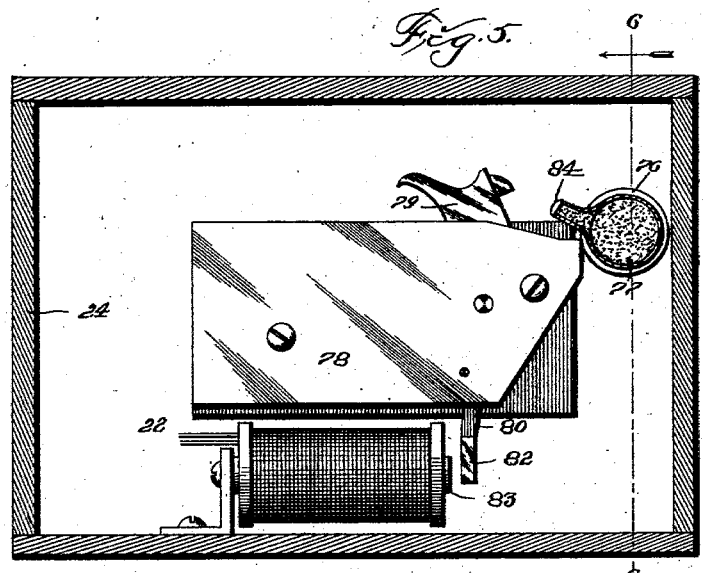
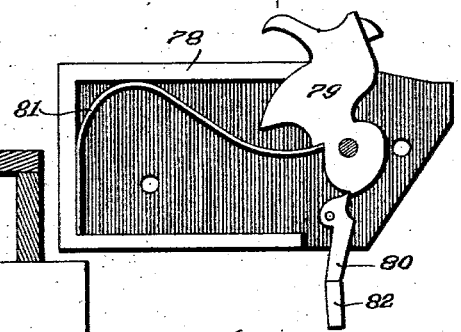
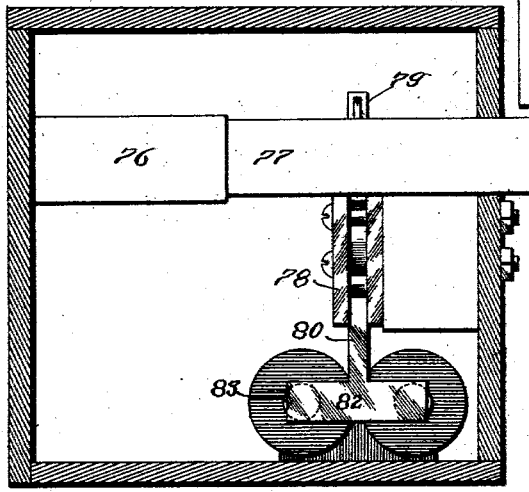
Attest:
R. G. Orwig.
F. C. Tate.
Inventor:
Wilbur Mayes,
By Hedworth
Att'y No. 634,118. Patented Oct. 3, 1899.
W. MAYES.
DANGER SIGNAL SYSTEM.
(Application filed Sept. 6, 1898.)
(No Model.) 6 Sheets—Sheet 5.
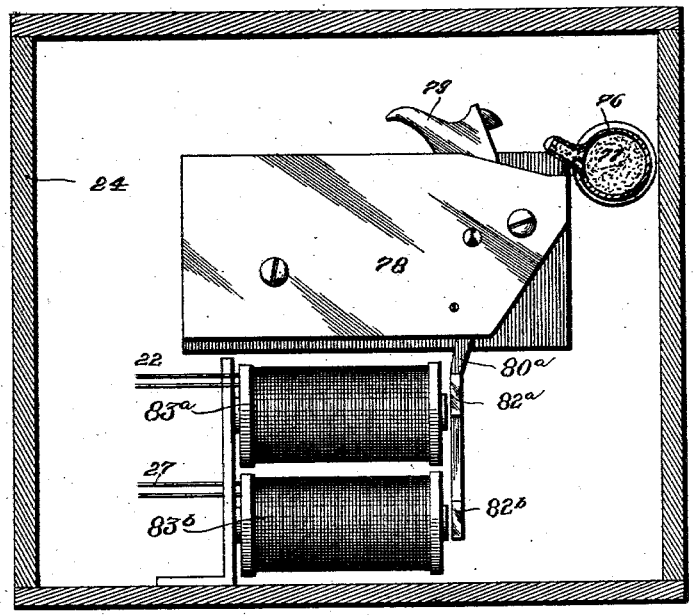
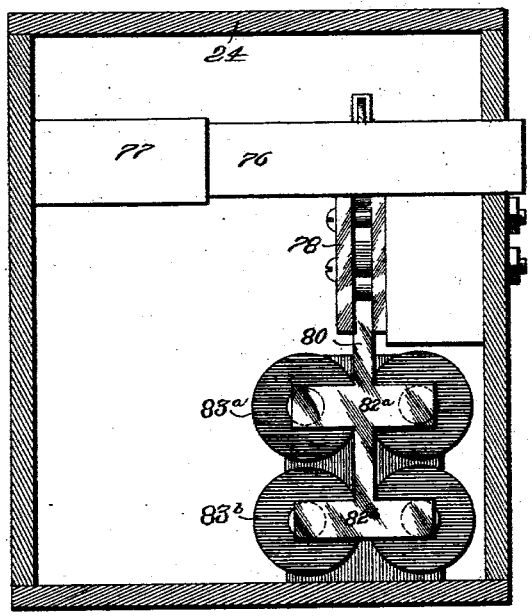
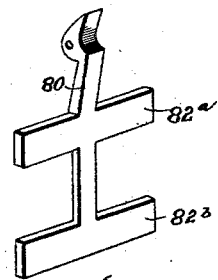
Attest:
R. G. Orwig.
P. C. Tate.
Inventor:
Wilbur Mayes
By J. L. Sweet
Att'y

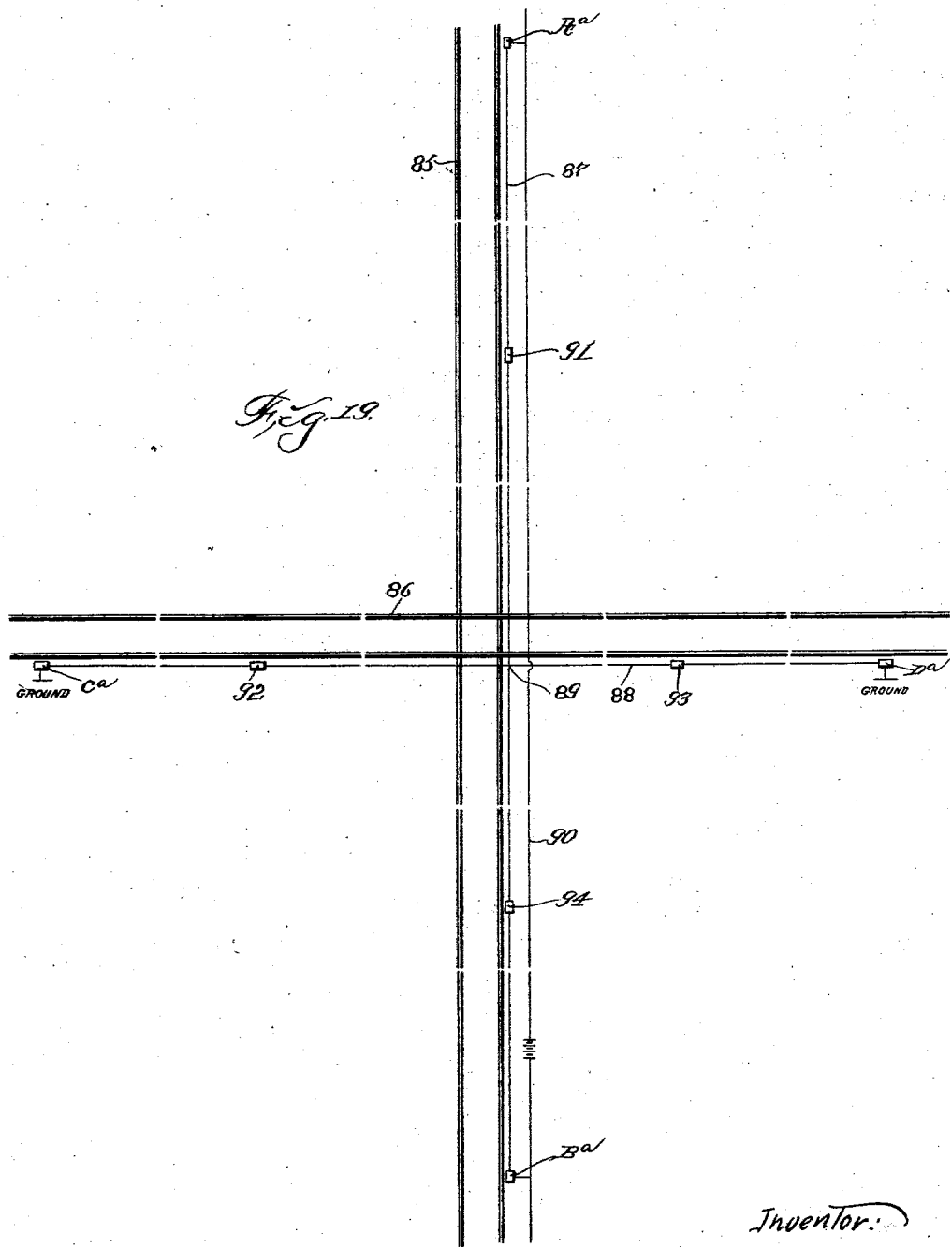

UNITED STATES PATENT OFFICE.

WILBUR MAYES, OF OMAHA, NEBRASKA.

DANGER-SIGNAL SYSTEM.

SPECIFICATION forming part of Letters Patent No. 634,118, dated October 3, 1899.

Application filed September 6, 1898. Serial No. 690,385. (No model.)

*To all whom it may concern:*

Be it known that I, WILBUR MAYES, a citizen of the United States of America, and a resident of Omaha, Douglas county, Nebraska, have invented certain new and useful Improvements in Danger-Signal Systems, of which the following is a specification.

The object of the present invention is to provide improved means for signaling the crews of railway-trains approaching each other on a single track and to acquaint one or another, or both, of said crews with the proximity and approach of the other train. To this end I employ one or more visual signals so located as to be exhibited by the passage of two approaching railway-trains within a predetermined limit of safe and proper separation, the train first to enter a block setting in motion certain mechanism which when acted upon by the second train entering the same block will complete an electric circuit and operate to display the signal at one or both stations adjacent to the railway-track.

As one type of the signal mechanism for use in connection with my improved system I may employ a calcium flash-light apparatus, with which is associated a discharge mechanism that is included in the electric circuit, whereby the calcium is ignited and discharged across the space separating the trains in a manner to present a rocket or projected flame of fire within the vision and in advance of one or another, or both, crews.

The invention furthermore consists in a novel construction and arrangement of parts constituting an automatic switch mechanism or a circuit making and breaking device which is adapted to be set in operation by a track mechanism and which includes means for the purpose of rewinding the switch mechanism.

The invention further consists in the novel combination of elements and in the construction and arrangement of parts, which will be hereinafter fully described and claimed.

To enable others to understand the invention, I have illustrated different embodiments thereof in the accompanying drawings, forming a part of this specification, and in which—

Figure 1 is a diagram plan, and Fig. 2 a diagram elevation, illustrating the system of operation of my signaling apparatus in advance of approaching trains on a single track. Fig. 3 is an elevation illustrating the means employed to establish a circuit by the passage of a moving train. Fig. 4 is a detail of the mechanism shown boxed in Fig. 3. Figs. 5, 6, and 7 are detail elevations of the mechanism whereby the calcium or other signaling substance is ignited and discharged. Figs. 8, 9, 10, 11, 12, 13, 14, and 15 are detail views of elements of construction of the mechanism shown assembled in Figs. 3 and 4. Figs. 16, 17, and 18 are views illustrating a modified construction of mechanism for igniting or discharging the signaling substance. Fig. 19 is a diagram plan illustrating the apparatus as employed to protect railway-trains at a grade-crossing of two tracks.

In the construction and operation of the apparatus as shown and as employed in carrying out my system of signaling the numeral 20 designates a single-track railway, and 21 the supply or main line of an electric circuit—such, for instance, as an electric-telegraph line paralleling and adjacent to the track. A conductor 22 branches from the main line 21 and extends through a circuit maker and breaker 23, located at station A of my system, thence to and through a signal-box 24, located at about one hundred yards distant from station A, thence to and through a signal-box 25, located at about a hundred yards distant from station B of my system, thence to and through a circuit maker and breaker 26 in station B, and thence to ground.

A train in passing station A starts a clock mechanism in the circuit maker and breaker 23, hereinafter described, and establishes a circuit between the two portions of the branch conductor 22 at 23 and proceeds toward the signal-box 24. A train running in the opposite direction in passing station B starts a clock mechanism in the circuit maker and breaker 26 and establishes a circuit between the two portions of the conductor 22 at 26 and proceeds toward the signal-box 25. When a connection is made at 26, the circuit is complete from the main line 21 to ground through both circuit makers and breakers 23 and 26, and also through both signal-boxes 24 25, and a signal is exhibited at both boxes. If the second train enters the block before the first train passes the signal-box 24, then both trains will receive danger-signals, or if the first train has passed 24 it may or may not get the signal from 25; but in any instance one or the other, or both, of the trains gets one or the other, or both, of the signals and has a sufficient distance of protected track in which to stop and signal the other train. The clock mechanisms are timed to run down and break the circuit before a third or following train enters the block, and the initial mechanism is wound up and started to initiate the making of another circuit by said third train to enter the block, and the circuit is completed, as before, and signals given by the fourth train to enter the block, provided the fourth train enters opposite to the third train and while the block is occupied.

It follows from the construction hereinafter described that the signal-boxes must be replenished and reset manually after each operation thereof, and this may be done by the crew of one or another of the signaled trains or otherwise, as desired. It will also be observed that each block involves the use of two electrically-operated circuit-closing switches and two signals arranged between said switches, the latter being arranged so that one train may pass both switches without affecting the signals, and another train may follow in the same direction without producing any effect, while, on the other hand, when one train is moving in one direction and another train starts out in the opposite direction both switches are set into action so as to complete the circuit and cause the operation of the signals.

A conductor 27 branches from the main line 21 and extends through a circuit maker and breaker 28, located at station C of my system, thence to and through a signal-box 29, located at about one hundred yards distant from station C, thence to and through a signal-box 30, located at about one hundred yards distant from the fourth station D of my system, thence to and through a circuit maker and breaker 31 in station D, and thence to ground.

A train in passing station C starts a clock mechanism in the circuit maker and breaker 28 and establishes a circuit between the two portions of the branch conductor 27 at 28 and proceeds toward the signal-box 29. A train running in the opposite direction in passing station D starts a clock mechanism in the circuit maker and breaker 31 and establishes a circuit between the two portions of the branch conductor 27 at 31 and proceeds toward the signal-box 30. When a connection is made at 31, the circuit is complete from the main line 21 to ground through both circuit makers and breakers 28 31 and also through both signal-boxes 29 30, and a signal is exhibited at both boxes. If the second train enters in the block before the first train passes the signal-box 29, then both trains will receive danger-signals, or if the first train has passed 29 it may or may not get the signal from 30; but in any instance one or the other, or both, of the trains gets one or the other, or both, of the signals and has a sufficient distance of protected track in which to stop and signal the other train.

The foregoing description generally covers two complete "blocks" in the system. These blocks are overlapped at their adjacent ends, and other like blocks may overlap the opposite ends of the ones described in the event that the system employs more than two blocks. The purpose of overlapping is to prevent collisions between stations and nearest signal-posts, and, furthermore, to provide for different speeds of trains. In overlapping the signal-boxes are operated by either of the circuits, each circuit being provided with a discharging-magnet in the box through which it passes, as hereinafter described. Thus train No. 1 may initiate a circuit at 31, train No. 2 may initiate a circuit at 26; train No. 1 will complete the circuit of train No. 2 at 23, and train No. 2 will complete the circuit of train No. 1 at 28, each train receiving a signal at either of four signal-boxes, dependent on the location of the train and the range of vision of the crew.

The double arrangement of electromagnets hereinafter described may be avoided by wiring to two main or supply conductors, if convenient or desirable.

The circuit makers and breakers employed in my system are alike in construction, and I will now describe the manner of making, mounting, and using the same. By referring to Figs. 3, 4, 12, 13, 14, and 15 it will be seen that a box or inclosure 32 is mounted on a post or other suitable support 33. A frame 34 is mounted rigidly in the box 32, and a shaft 35 is mounted for rotation in the frame. A pinion 36 is mounted loosely on the shaft 35 and meshes with a speed-increasing train of gearing terminating in a shaft 37, on which is mounted rigidly a fan-governor 38. A clutch 39 is feathered on the shaft 35 and engages at times with the clutch on the adjacent side of the pinion 36 and is held in engagement therewith normally by means of an expansive coiled spring 40, mounted on the shaft 35 and impinging one of the standards of the frame 34 at one end and the clutch at the other end. The shaft 35 is connected to the inner end of a convolute spring 41, contained in and attached at its outer end to a box 42, mounted on one of the standards of the frame 34. The spring 41 in unwinding imparts a rotary motion to the shaft 35 and is governed in its speed of relaxation by the fan-governor 38 and the friction of the train of gearing. The elements just described constitute the clock mechanism hereinbefore mentioned. On one extremity of the shaft 35 is mounted a rewinding wheel or pulley 43, on the periphery of which is mounted and fixed at its extremity a rewinding-cable 44. The rewinding-cable 44 extends from the box 32 into a box 45 and is attached to one end of a lever 46, mounted for oscillation on a stand 47, located within and fixed to said box 45. The lever 46 normally is retained in a given position (illustrated as horizontal) by a retractile coiled spring 48, connecting the otherwise free extremity of the lever with an eye 49 at the foot of the stand. Located contiguous to one of the rails of the track 20 is a box 50, and a lever 51 is fulcrumed in a bearing on the central portion of the top of said box and vertically positioned, equal portions of said lever extending outside and within the box. The outwardly-projecting portion of the lever 51 is arranged in such proximity to the track 20 as to be engaged by an arm (not shown) carried by and laterally projecting from the pilot of a locomotive or some other suitable portion of the moving train traveling upon the track 20, and it is intended that said lever will be oscillated by the impact therewith of said arm once only in the passage of each train. The lever 51 is maintained normally in equilibrium by springs 52 53 of an expansive character coiled upon the end portions of a frame 54. The frame 54 is seated at its ends in the top of the box 50, is arched below said top and traverses the lever loosely, the springs impinging opposite sides of the lever and being shown in the lower portion of Fig. 4 expanded to their limit. A frame 55 of approximately U shape is fixed at its extremities in the bottom of the box 50 (see Fig. 12) and extends upwardly obliquely across the plane of the lever 51 within the box. A traveler 56, Figs. 10 and 11, is provided with cross-bars 57 58, forked at their extremities and embracing the sides of the frame 55 in said forks for sliding contact with the frame. (See Fig. 12.) The traveler 56 is provided with an eye portion 59, to which is attached the lower end of an actuating-cable 60. The cable 60 leads from the box 50 around suitable guiding-sheaves 61 and into the box 45, where the upper end thereof is attached to the lever 46 in one or another of the apertures therein adjacent to the point of attachment of said lever to the rewinding-cable 44. At this point it may be observed that the principal function of the lever or bar 46 is to provide simple and efficient means for returning the traveler of the track mechanism to its normal position and leaving the gear mechanism to run perfectly free, and the adjustable connection of the cable with one end of the lever or bar 46 provides means whereby the length of time the clockwork is to run may be regulated. A trigger 62 is pivoted on the cross-bar 57 of the traveler and is held at a given oblique angle relative to the traveler normally by means of a torsional spring 63, which is mounted on the cross-bar 57 and impinges against the traveler and trigger at opposite ends. The traveler is located normally at the upper extremity of the frame 55, and the cables 44 60 are approximately taut. Now in the passage of a train upon the track 20 in the direction indicated by an arrow 64 in Fig. 4 the lever 51 will be oscillated against the expansive resilience of the spring 52 and will not affect the traveler or the signal mechanism, since said lever in such movement engages no other element and is returned to equilibrium by expansion of the spring 52; but upon the passage of a train in the direction of the arrow 65 in Fig. 4 the lever 51 is oscillated, the lower chamfered extremity thereof passes over the trigger 62, said trigger yielding to permit said passage and immediately repositioning, and is returned toward equilibrium by expansion of the spring 53. The trigger 62 is engaged by the lower end of the lever 51 in the return of said lever to equilibrium, and the resilience of the spring 53 is sufficient to move the traveler downwardly along the frame 55 and in so doing exerts a strain on the rewinding-cable 44, through the medium of the cable 60 and lever 46, that will result in a rotary movement of the rewinding-pulleys 43 and rotation of the shaft 35 to rewind the spring 41, whereby said shaft has been stated to be actuated, the clutch 39 yielding to permit such rewinding rotation of the shaft without affecting the pinion 36. At a certain point in the downward movement of the traveler 56 the lever 51 is released from the trigger 62 by slipping forwardly over the same, and the traveler is repositioned, as shown, through the retractile influence of the spring 48 acting upon the lever 46 and actuating-cable 60. The upper end of the rewinding-cable 44 is attached to the rewinding-wheel 43 by means of a hook 43$^a$, projecting from the periphery of said wheel, as shown in Fig. 13.

I will now proceed to describe the circuit maker and breaker shown by Figs. 3, 4, 8, 9, 14, and 15. The branch conductor 22, entering the box 32 from the main line 21, is attached to a binding-post 66, fixed to and depending from the top of said box. (See Fig. 4.) The lower end of the binding-post 66 is forked, and slots 67 68 are formed in the arms of said fork. (See Figs. 8 and 9.) A contact wheel or trolley 69 is mounted in the fork of the binding-post and provided with trunnions 70 71, entering loosely the slots 67 68 and arranged to rise and fall therein with a minimum degree of friction. A circuit-wheel 72 (making and breaking) is mounted rigidly on and insulated from the shaft 35, and a binding-post 73 is mounted in and projects laterally from said wheel, to which the binding-post is attached, the inner end of the portion of the branch conductor 22 extending from the box 32 to the signal-box 24. The circuit-wheel 72 is a conductor, and on the periphery thereof the contact wheel or trolley 69 rides. The periphery of the circuit-wheel 72 is notched at one point and a segment of vulcanite 74 is mounted in said notch. A stop 75 also is mounted in and projects laterally from the circuit-wheel 72, and it is the function of said stop to engage one of the standards of the frame 34 and check the rotation of the circuit-wheel when the vulcanite segment 74 engages with and carries the contact wheel or trolley 69, thereby breaking the circuit. When the mechanism is rewound, as hereinbefore described, the circuit-wheel 72 is rotated to such an extent as to carry the vulcanite segment 74 away from the contact wheel or trolley 69 and permit said contact-wheel to rest upon and establish a circuit with the conducting portion of the periphery of the circuit-wheel 72.

The branch conductor 22, as well as the other branch conductors, leads to signal-boxes, as hereinbefore mentioned, and as such boxes are alike in construction I will proceed to describe one only of them, reference being had to Figs. 5, 6, and 7. The signal-box 24 may be mounted on a pole or other suitable support located contiguous to the railway-track 20 and is supplied with a flash-powder cartridge-support 76, adapted to receive one end of the cartridge 77, the other end of which protrudes through a wall of the box or casing 24. A discharging mechanism is located adjacent to the inner end of the socket 76 and comprises a casing 78, in which is pivoted a hammer 79, a trigger 80, arranged to engage and hold said hammer back at times, said trigger being fulcrumed in the casing 78, and a lock-spring 81, contained in the casing 78 and impinging the hammer 79. An armature 82 is mounted for engagement with the trigger 80 and is arranged in proximity to a helix or electromagnet 83, supported at the bottom of the box 24. The branch conductor 22 leads to and through the helix or electromagnet 83. The cartridge 77 is provided intermediate its ends with a firing-tube containing a fulminating-cap 84, arranged and positioned to be exploded by impact therewith of the hammer 79, and within the cartridge adjacent to the cap may be located a quantity of powder ignitible by the explosion of the cap and communicating with a charge of calcium powder or other suitable substance contained in and dischargeable from the cartridge. Upon the completion of the circuit the helix is electrified or magnetized and attracts the armature 82, thereby releasing the trigger 80 from the hammer 79 and permitting the forcible descent of said hammer under the impulse of the lock-spring 81 to impact with the fulminating-cap 84, thereby discharging the gunpowder and igniting the flash-light powder in the cartridge, the flame from which is projected across the track 20 and presents a visual signal to the crew of an approaching train within range thereof. It is desirable to use in the cartridge a substance, such as calcium powder, that will make a flash-light of determinable and perceptible continuance in order to exhibit the signal brilliantly for the maximum of time.

In Figs. 16, 17, and 18 I have illustrated the discharging mechanism with a trigger $80^a$, carrying two armatures $82^a$ $82^b$, arranged for actuation by two disconnected electromagnets $83^a$ $83^b$, one of the magnets being connected with the branch conductor 22 and the other magnet being connected with the branch conductor 27, the arrangement being such that the magnetizing of either magnet attracts one or the other of the armatures and discharges the signal.

In Fig. 19 I have illustrated two railway-tracks 85 86, crossing each other on a common grade and at right angles; but the angle of crossing is immaterial. In this instance I provide two branch conductors 87 88, electrically connecting with each other at 89 and taking current from a single main conductor 90. Within approximately one thousand yards or any other appropriate distance of the crossing of the tracks and in either of four directions therefrom I have located signal-boxes 91, 92, 93, and 94, and at a still farther distance from the crossing I have stations A$a$ B$b$ C$c$ D$d$, each of which contains a circuit making and breaking device and rewinding mechanism, as hereinbefore described. In the use of the system, as illustrated in Fig. 19, the entering of a train between either of the stations and the point of crossing will initiate the making of a circuit, and the entering of a train between either of the other stations and the crossing will complete a circuit between the stations passed and discharging some two of the signals in the boxes 91 92 93 94, adjacent to the track and in advance of the moving train, said signal-boxes each having the visual signal mechanism hereinbefore described.

What I claim is—

1. In an electrical signaling system for railways, the combination of the separated circuit-closing switch devices, signal mechanisms located between the switch devices, and a normally-open electric circuit including the switch devices and the signal mechanisms, one of the switch devices being arranged to initiate a circuit by a train moving in one direction, and the other switch device being arranged to complete the circuit by a train moving in the opposite direction, substantially as set forth.

2. In an electrical block-signaling system, the combination of the separated block-stations, each including an electrical circuit-closing switch device and an electrically-operated signal mechanism, and a normally-open electric circuit including in series the switch devices and the signals, one of the switch devices being arranged to initiate a circuit by a train moving in one direction, and the other switch device being arranged to complete the circuit by a train moving in the opposite direction, substantially as set forth.

3. In an electrical block-signaling system, the combination with overlapping blocks, of separated circuit-closing switch devices associated with each block and located respectively at the ends thereof, a pair of electrically-operated signals arranged between the switch devices of each block, and an independent circuit associated with each block and including the switch devices and the signals thereof, and said independent circuit also including the overlapping signal of the other block, substantially as set forth.

4. A signaling apparatus for railways comprising overlapping blocks, two open circuits for said blocks, switch mechanism for each block whereby the making of a circuit is initiated upon the entrance of a train at the extremity of one block, switch mechanism for each block for completing said circuit upon the entrance of another train at the other end of said block, together with signal mechanisms located between the switch mechanisms of each block and arranged to display signals upon the completion of either circuit, substantially as described.

5. In an electrical signaling system, the combination with an electrical circuit, and a circuit-closing device, of a signal comprising a box having an interior cartridge-support, a flash-powder cartridge fitted to said support and protruding at one end through a wall of the box, said cartridge being provided at an intermediate point with a lateral fulminate-holder, a spring-actuated hammer arranged at one side of the cartridge and operating in the plane of said fulminate-holder, electromagnets included in the electrical circuit, and a trip-armature actuated by the magnets and having an operative engagement with said hammer, substantially as set forth.

6. In an electrical signal system, the combination of the spring-actuated gear mechanism, a switch associated with said mechanism, and included in the electrical circuit, a track device, a cable and wheel mechanism actuated by the track device for automatically rewinding the spring of the gear mechanism, and an oscillatory spring-retracted lever arranged intermediate of the gear mechanism and the track device, and having a connection at one end with the cable, substantially as set forth.

7. In an electric block-signaling system, a switch mechanism comprising a train of gearing, a spring driving the same, cable and windlass mechanism for rewinding a traveler connected to said cable, a lever arranged for movement in one direction by a passing train and returned by a spring, a trigger connecting said lever and traveler, whereby in the return of the lever the traveler is advanced to strain the cable and rewind the spring, and a spring-held lever intermediate of the cable, substantially as described.

8. In an electric block-signaling system, a switch mechanism including a train of gearing, a spring driving the same, cable and windlass mechanism for rewinding the spring, a traveler attached to said cable, a lever arranged for movement in one direction by the passing train, a spring for returning said lever, and a trigger connecting said lever and traveler, whereby in the return of the lever the traveler is advanced to strain the cable and rewind the spring, substantially as described.

9. In an electric block-signaling system, a switch mechanism including a train of gearing, a spring driving the same, cable and windlass mechanism for rewinding the spring, a traveler connected to said cable, a guide for the traveler, an oscillating lever, a trigger pivoted on the traveler and arranged to yield for the passage of the lever in one direction and influenced in its return movement to engage with said lever, and an electric switch operated by or with said train of gearing, substantially as described.

Signed by me at Des Moines, Iowa, this 16th day of July, 1898.

WILBUR MAYES.

Witnesses:
  S. C. SWEET,
  J. C. TATE.